(12) United States Patent
Kreitmair-Steck et al.

(10) Patent No.: US 9,213,096 B2
(45) Date of Patent: Dec. 15, 2015

(54) PROXIMITY WARNING SYSTEM FOR HELICOPTERS

(71) Applicant: EUROCOPTER DEUTSCHLAND GMBH, Donauworth (DE)

(72) Inventors: Wolfgang Kreitmair-Steck, Munich (DE); Tim Waanders, Munich (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 270 days.

(21) Appl. No.: 13/721,145

(22) Filed: Dec. 20, 2012

(65) Prior Publication Data
US 2013/0265185 A1    Oct. 10, 2013

(30) Foreign Application Priority Data
Dec. 28, 2011   (EP) .................................. 11400064

(51) Int. Cl.
*G01S 13/93*  (2006.01)
*G01S 13/87*  (2006.01)

(52) U.S. Cl.
CPC ............. *G01S 13/9303* (2013.01); *G01S 13/87* (2013.01)

(58) Field of Classification Search
CPC .............................. G08G 5/045; G01S 13/9303
USPC ........................................ 342/29; 244/17.13
See application file for complete search history.

(56) References Cited

U.S. PATENT DOCUMENTS

| | | | |
|---|---|---|---|
| 3,896,446 A * | 7/1975 | Kondoh et al. ............... 343/705 |
| 5,050,087 A * | 9/1991 | Walrath et al. ..................... 701/4 |
| 7,019,682 B1 * | 3/2006 | Louberg et al. .................. 342/22 |
| 7,463,183 B2 | 12/2008 | Reich | |
| 7,751,976 B2 | 7/2010 | Matuska | |
| 2009/0174589 A1 * | 7/2009 | Moraites ......................... 342/14 |
| 2012/0029738 A1 * | 2/2012 | Brunetti et al. .................. 701/11 |
| 2012/0119495 A1 * | 5/2012 | Bettermann et al. ............ 290/44 |
| 2014/0062753 A1 | 3/2014 | Grooters et al. | |

FOREIGN PATENT DOCUMENTS

| | | |
|---|---|---|
| CN | 102259704 | 11/2011 |
| DE | 4328573 A1 | 3/1995 |
| DE | 10015164 A1 | 10/2001 |
| DE | 102006053354 A1 | 5/2008 |
| WO | 2007024635 A2 | 3/2007 |
| WO | 2011136707 A1 | 11/2011 |
| WO | 2012084958 | 6/2012 |

OTHER PUBLICATIONS

Search Report and Written Opinion; Application No. EP 11400064; dated May 31, 2012.

* cited by examiner

*Primary Examiner* — Timothy A Brainard
(74) *Attorney, Agent, or Firm* — Brooks Kushman P.C.

(57) ABSTRACT

A proximity warning system for a helicopter (22) comprising at least two radar units (1-3), preferably three radar units (1-3) arranged to transmit microwaves and receive reflections of said microwaves from obstacles (10). The at least two radar units (1-3) are fixed next to a main rotor head(s) (20) of the helicopter (22) for horizontally scanning an entire environment of 360° around the helicopter (22), all of said at least two radar units (1-3) operating essentially at the same frequency.

20 Claims, 6 Drawing Sheets

PROXIMITY WARNING SYSTEM FOR HELICOPTERS

CROSS REFERENCE TO RELATED APPLICATIONS

This application claims priority to European application No. 11 400064.9, filed Dec. 28, 2011, the disclosure of which is incorporated in its entirety by reference herein.

BACKGROUND OF THE INVENTION (1) Field of the Invention

The present invention relates to a proximity warning system for helicopters with the features of the preamble of claim 1.

(2) Description of Related Art

There is a need for a helicopter obstacle detection and rotor strike warning system.

The document DE4328573 A1 discloses an all-weather sight system which combines information from a radar sensor based on ROSAR with navigation and flight control information to produce a synthetic sight for the pilot. In this case, the radar uses the rotary movements of rotating arms—in this case in the form of a capstan (spider) mounted above the rotor axis—which is protected against aerodynamic forces by an aerodynamically formed body (radome). The radar transmitter as well as the radar receiver are positioned on the rotor head.

The document WO2011136707 A1 discloses a helicopter obstacle detection and information system arranged to transmit laser light and receive reflected laser light from obstacles for detecting and informing the pilot of a helicopter of obstacles in proximity of the helicopter. The system comprises an obstacle detection sensor unit, being arranged to be mounted on a rotor head of a helicopter such that said obstacle detection sensor unit is arranged to rotate with said rotor head. The system further comprises an information unit. The transmitted laser light is arranged to cover a sector volume around a rotor head axis, having a coverage defined as a radial extension (R1, R2) in a sector plane around said rotor head axis and an angular extension perpendicular to said sector plane. Communication means are arranged for communication between said sensor unit and said information unit.

The document DE102006053354 A1 discloses a system with radar sensors (RS0, RSm, RS (m+1), RSn) transmitting signals to a detection and evaluation unit, where the signals represent distance information. The unit displays the signals on a cockpit-display after processing and comparing the information with a preset warning threshold value. The sensors operate with short-range and long-range wavelengths for scanning a sphere within, rear and lateral of the helicopter and a sphere in front of a helicopter, respectively. The information regarding obstacles displayed on the cockpit display is restricted to distances in a number of sectors. A footprint is received by the signals for identification and differentiation between aircrafts.

The document DE 10 015 164 A1 discloses a method of operating a heliradar with a laser radar in a helicopter, using a sensor. The sensor data is merged with a data registered in an on-board-intrinsic database and accordingly the flight path and the landing location are displayed in a virtual cockpit display. The method involves the operation of a heliradar with a laser radar in a helicopter, using a sensor. The sensor data is merged with a data registered in an on-board-intrinsic database and accordingly the flight path and the landing location are displayed in a virtual cockpit display The document WO2007/024635 A2 discloses an obstacle avoidance system including an input control device, a sensor suite, and a communication feedback loop. The input control device is preferably operable to create a first force, while the sensor suite is configured to detect nearby obstacles, and the communication feedback loop is in communication with the input control device and the senor suite so that said communication feedback loop is operable to generate a command signal in response to detection of a nearby obstacle. Preferably, the obstacle avoidance system is used in combination with an apparatus, such as a rotary wing aircraft.

The obstacle avoidance systems of the state of the art provide a synthetic radiating aperture by rotating an antenna along a circular path with a radius r, said synthetic radiating aperture being used—after complex measurements of the precise path and elaborate calculations—for assessment of the radar resolution in azimuth.

BRIEF SUMMARY OF THE INVENTION

The object of the present invention is to provide an improved proximity warning system for helicopters, both for helicopters with single main rotor and helicopters with dual/tandem main rotors.

The solution is provided with a proximity warning system for helicopters as defined by the features of claim 1. Preferred examples of the invention are set forth by the appended dependent claims.

According to the invention a proximity warning system for a helicopter comprises a roof top structure, a main rotor, a main rotor head, a standard housing and at least two, preferably three radar units arranged to transmit microwaves and receive reflections of said microwaves from obstacles. The standard housing is radar transparent, at least for the radar units of the inventive proximity warning system. The number of radar units for the inventive proximity warning system is not limited. The at least two radar units are fixed next to a main rotor head(s) of the helicopter for horizontally scanning an entire environment of 360° around the helicopter. All of said radar units operate essentially at the same frequency. The invention allows detection of obstacles with a 360° horizontal coverage and therefore monitoring of the entire region around the helicopter. Using radar signals instead of laser signals increases the possibilities of the penetration of fog, rain, snow fall, and brown-out/white-out conditions. The inventive proximity warning system provides results concerning obstacles in a certain beam direction as well as the distance of such obstacles. The inventive proximity warning system provides a technique for dealing with blind regions of the radar units. The inventive proximity warning system is less complex compared to any proximity warning systems known from the state of the art, as the inventive proximity warning system uses a real radiating aperture—an assessment of the precise path of the antenna is dispensable with the inventive proximity warning system.

According to a further advantageous aspect of the invention, a beam width of each sensor in elevation is limited to a maximum of 40° in order to reduce the false alarm rate due to ground returns if the helicopter is close to the ground.

According to a further advantageous aspect of the invention, the radar units are each electronically scanning in horizontal direction to avoid moving parts in the system.

According to a further advantageous aspect of the invention computing means are provided inside each radar unit and there are further provided at least one information processing unit, filtering means and at least one display instrument. Thus any helicopter related returns can be filtered out for analysis and combination of the information from the different radar units and for preparation of the control of the display instrument which is performing the warning of the pilot.

According to a further advantageous aspect of the invention, said at least one display instrument comprises generation means for aural and/or haptic/tactile warnings.

According to a further advantageous aspect of the invention, all of said radar units are arranged in one plane on top of a standpipe through the main rotor head(s) or directly below the main rotor head(s). The advantageous arrangement close to the main rotor head(s) on the helicopter structure provides for optimal coverage of the rotor disk region which has to be protected by the proposed system.

According to a further advantageous aspect of the invention, each of said radar units has a defined scanning region horizontally and the sum of all scanning regions can be more than 360° in total to allow an arrangement of the radar units and evaluation of the information such, that any blind spots due to signal shading caused by helicopter parts, e.g. tail boom, are as much as possible reduced.

According to a further advantageous aspect of the invention, the range of the inventive proximity warning system is at least two times the diameter of the rotor for a security margin.

According to a further advantageous aspect of the invention, said radar units provide details about the range and the direction of any identified obstacles to the information processing unit.

According to a further advantageous aspect of the invention, said radar units are synchronized with the rotor in such a way that all scans are done while the rotors are not visible to the radar beams. Said synchronization allows avoidance of signal disturbances of the radar scan from the moving rotor. If the radar scanning would be independent from the rotation of the rotor, there would be risks to "see" the rotor blades in the scan of the radar unit at arbitrary positions. The consequence could be a high rate of false alarms avoided with the inventive solution.

According to a further advantageous aspect of the invention of three radar units, one is looking in forward direction and two radar units are respectively looking side- or backwards to the left and to the right of the helicopter.

According to a further advantageous aspect of the invention, said radar units are integrated into a cowling on top of the helicopter or fixedly installed in a standard housing, such as a radome, said housing having the shape of a torus open towards one side for easy installation or de-installation of radar units on the cowling. This housing is easy to fix on the helicopter without any need to remove the main rotor head(s) or rotor blades of the helicopter. Thus the area of any blind regions/blind spots of the proximity warning system can be reduced advantageously to a minimum.

According to a further advantageous aspect of the invention, said radar unit comprises an electronically scanning radar antenna, radar electronics for signal processing and further comprises interface electronics for preparing information for transmission to the information processing unit, said transmission of information being performed by wire or by radio transmission.

According to a further advantageous aspect of the invention, said scanning regions of the rearward looking radar units are overlapping. The overlap is used for information combination and thus for reduction of any blind regions/spots of the inventive proximity warning system.

According to a further advantageous aspect of the invention, said radar units are operating in a frequency range between 70 GHz and 80 GHz. Said frequency range is high enough for reduction of the component dimensions and has still good penetration of environmental hazards such as fog, rain, snow fall and brown-out/white-out conditions.

A number of advantages are provided by means of the present invention, for example:
- a 360° horizontal coverage and therefore monitoring of the region around the helicopter.
- the radar units with electronically scanning antennas involve no mechanical parts and therefore increase the reliability of the system and reduce the maintenance effort,
- using radar signals instead of laser signals increases the possibilities of the penetration of fog, rain, snow fall, and brown-out/white-out conditions,
- the fixed installation just below the main rotor head(s) allows for a situational assessment with the proximity warning system around the helicopter without the need of turning rotors, as it is necessary e.g. for a system according to WO 2011/136707 A1, and
- the use of overlapping scanning regions, especially for the backward looking radar units allows for the reduction of blind regions of the proximity warning system according to the invention.

BRIEF DESCRIPTION OF THE SEVERAL VIEWS OF THE DRAWINGS

Preferred examples of the present invention will be described more fully hereinafter with reference to the accompanying drawings, in which examples of the invention are shown.

FIG. 1 schematically shows a proximity warning system in accordance with the present invention, FIG. 2a, 2b schematically show a lateral and a top view of a helicopter with a first embodiment of a proximity warning system in accordance with the present invention, FIG. 3a, 3b schematically show a lateral and a top view of a helicopter with a further embodiment of a proximity warning system in accordance with the present invention, FIG. 4a, 4b schematically show a top view of a sensor housing with a proximity warning system in accordance with the present invention, FIG. 5 schematically shows a graphic illustration of an aspect of a proximity warning system in accordance with the present invention, FIG. 6a, 6b schematically show embodiments of a housing of a proximity warning system in accordance with the present invention, FIG. 7 schematically shows a front view of a helicopter with a proximity warning system in accordance with the present invention, and FIG. 8 schematically shows a top view of a helicopter with a proximity warning system in accordance with the present invention.

DETAILED DESCRIPTION OF THE INVENTION

Figures 1, 5, 6A, 6B:
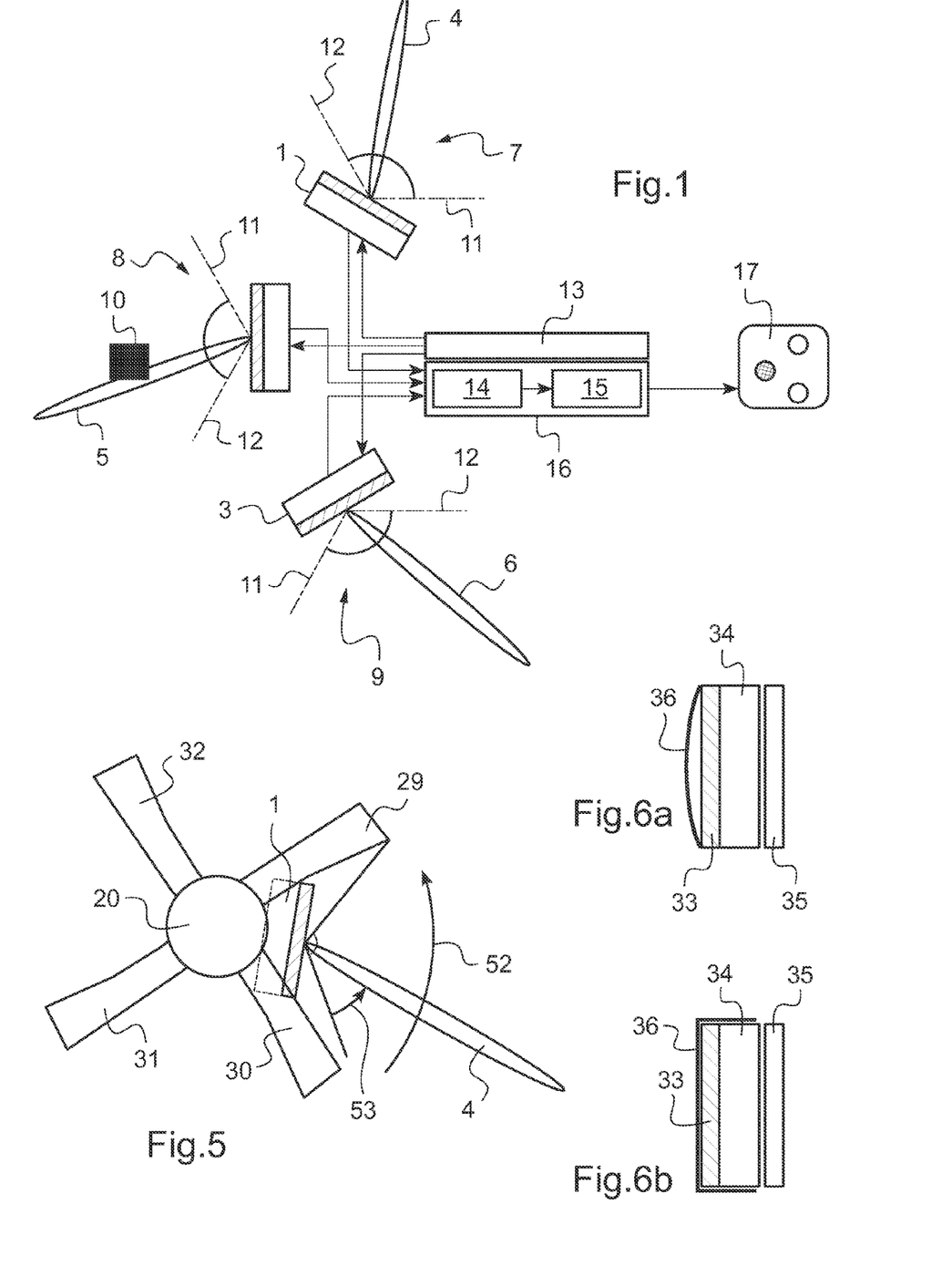

According to FIG. 1 a proximity warning system comprises six basic components, namely a right hand radar unit 1, a forward radar unit 2 and a left hand radar unit 3. Each of said radar units 1-3 emit a respective radar beam 4-6 in a horizontal direction scanning predefined regions 7-9 for any obstacles 10 in between angularly separated flanks 11, 12. Each of said radar units 1-3 are connected to a processor 13 for radar/rotor synchronization of each of said radar units 1-3. Signals from each of said radar units 1-3 are fed to a filter 14 and consequently to an analysis unit 15 of an information processing unit 16. The information processing unit 16 feeds data to a display instrument 17.

The radar units 1-3 are fixed respectively and the associated radar beams 4-6 are directed inside their respective scanning region electronically without any mechanical movement of an antenna or other parts.

Any reflections from an obstacle 10 detected by one or more of the radar units 1-3 are transmitted to and computed with associated radar electronics and transmitted to the information processing unit 16 including data regarding beam direction as well as the distance of the obstacle. The transmission from the radar units 1-3 to the information processing unit 16 can be performed either as a transmission by wire or wireless by radio transmission.

The information processing unit 16 provides amongst others two functions:

1. Filtering out of all obstacle information which are caused by any helicopter components, e.g. by the tail boom, by different antennas or wing parts.

2. Analysis of the resulting information and preparation of the information for transmission to the display instrument The display instrument 17 is converting any warning information from the information processing unit 16 into visual information and optionally aural and/or haptic/tactile information. A warning to the pilot is submitted via the display instrument 17 only in case an obstacle 10 has been identified within a predefined proximity of the helicopter.

The processor for radar/rotor synchronization 13 senses a reference point during the rotation of the rotor in order to synchronize the scanning of the radar units 1, . . . 3 to any gaps between turning rotor blades. The processor for radar/rotor synchronization 13 provides to the radar units 1, . . . 3 the timing signal for the start of the scanning process. The scanning is finished before the next rotor blade could interfere with the radar beam.

Figure 2A:
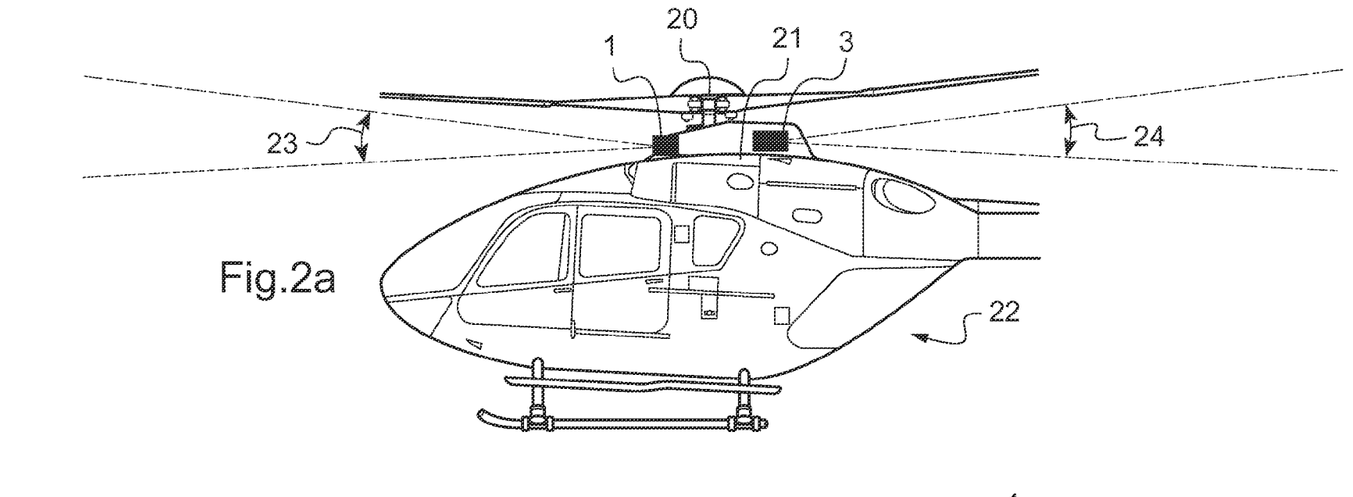
Figure 2B:
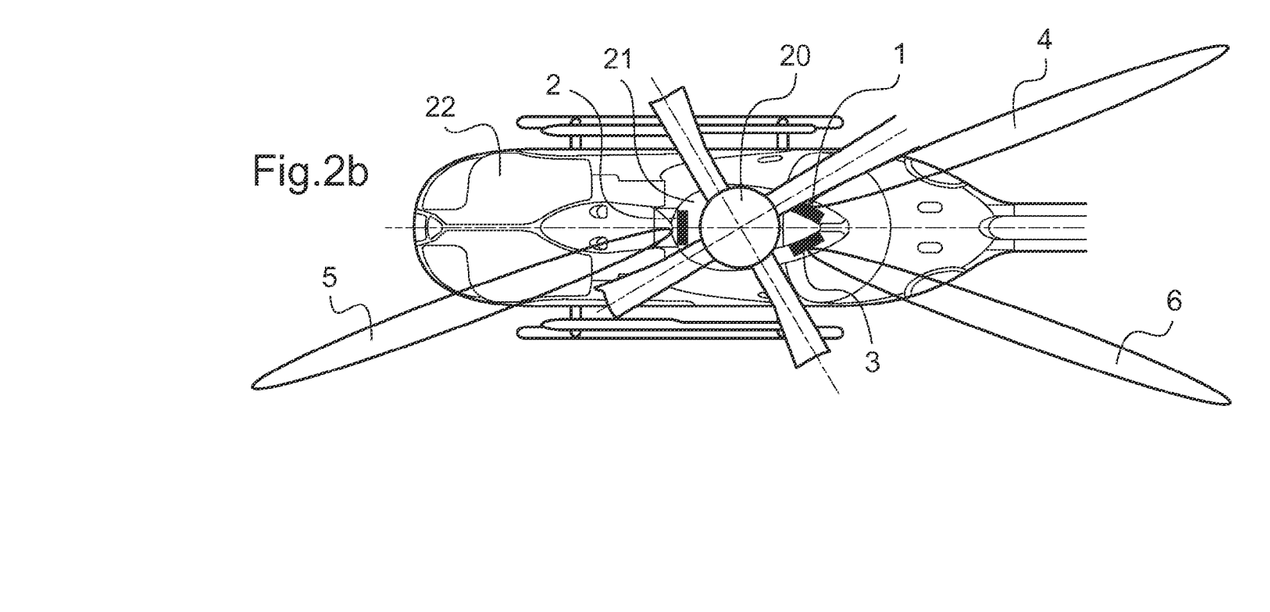

According to FIGS. 2a, 2b corresponding features are referred to with the references of FIG. 1. Three radar units 1-3 are integrated directly into the structure of a helicopter 22, close to a main rotor head 20 in a cowling 21 of said helicopter 22. An antenna (not shown) of the forward radar unit 2 is directed to the forward direction of the helicopter 22. The antennas (not shown) of the radar units 1 and 3 are respectively directed plus and minus 120° with respect to the antenna of the forward radar unit 2. Thus the left hand radar unit 3 is scanning the half-backwards region 9 and the right hand radar unit 1 is scanning the half-backwards region 7.

With scanning regions 7-9 of at least 120° for each radar unit 1-3, the proximity warning system covers horizontally 360° around the helicopter 22. Each radar unit 1-3 has a vertical beam width 23, 24, i.e. beam widths in elevation of at least 4° till up to 40°.

Figure 3A:
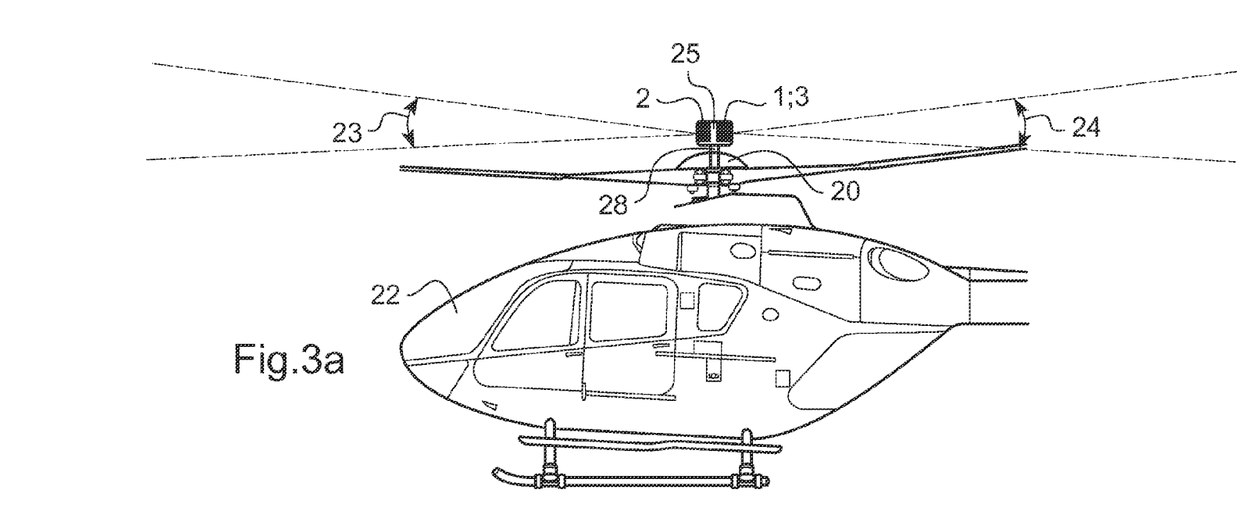
Figure 3B:
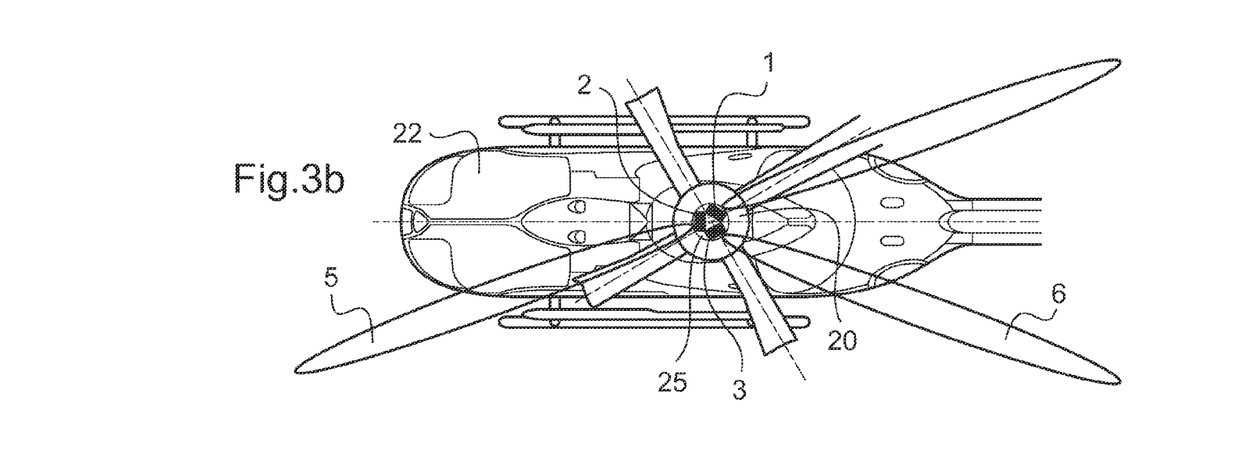
Figure 4A:
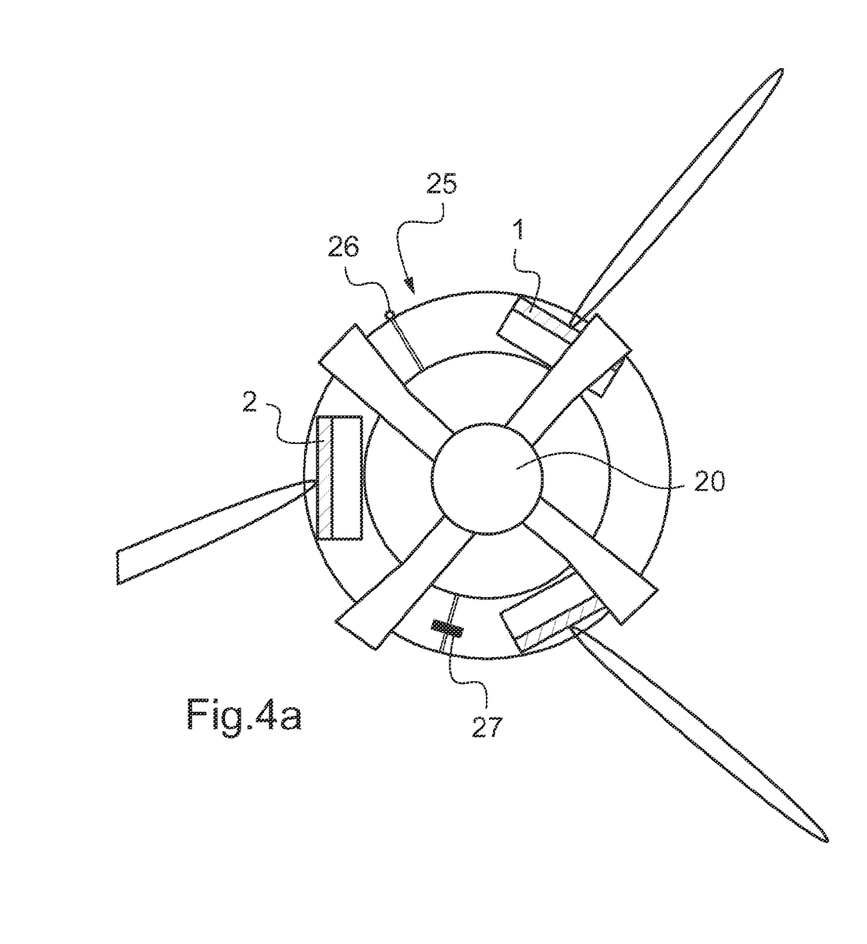
Figure 4B:
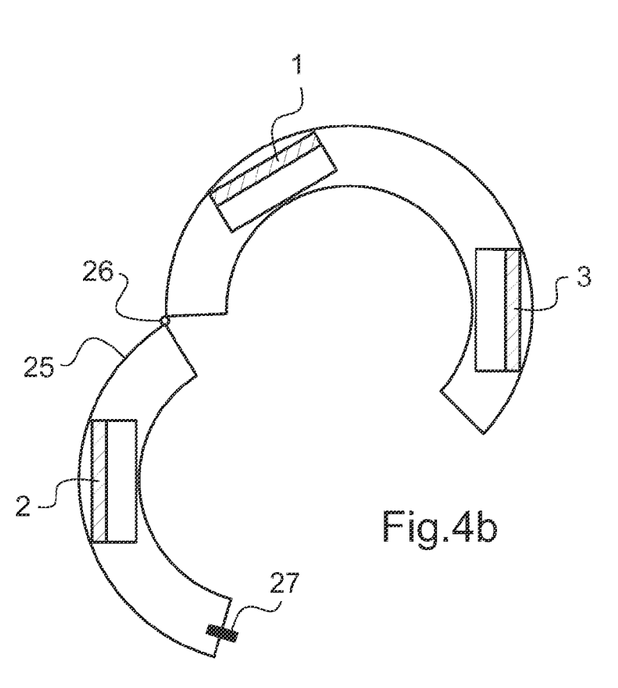

According to FIGS. 3a-4b corresponding features are referred to with the references of FIG. 1-2b. All radar units 1-3 are integrated with any cabling (not shown) into a torus like, special housing 25, close to the rotor head 20. The housing 25 can be fixed below the rotor head 20 on the roof top structure of the helicopter 22 (not shown) or, as shown in FIG. 3, the housing 25 can be mounted on a non-rotating standpipe 28 on top of the rotor head 20. The standpipe 28 is conducted through a hole in the rotor head 20 and the gearbox and fix joined with the structure of the helicopter 22.

The housing 25 is constructed with a joint 26 and a closure 27 for the sensor housing 25. The closed housing 25 integrates the radar units 1-3. The opened housing 20 allows removal of the radar units 1-3.

According to FIG. 5 corresponding features are referred to with the references of FIG. 1-4b. Synchronizing e. g. the horizontal scanning radar beam 4 with the rotation 52 around rotor head 20 of any of the rotor blades 29, 30 is effected by a synchronization signal sent from the processor for rotor/radar synchronization 13 to e. g. radar unit 1 when the corresponding scanning region 7 is available for scanning, i.e. any of the rotor blades 29, 30 do not shade the concerned scanning region 7. The rotor blades 29, 30 do not shade the concerned scanning region 7 as long as said rotor blades 29, 30 are outside a current scanning angle 53 of the horizontal scanning radar beam 4. Alternatively synchronization may be spared by "ignoring" all obstacles 10 which are within the range of the rotor radius. Thus any obstacle recognition according to this alternative would start only at a distance of about 50% of the rotor diameter, e.g. at about 5 m distance, from the radar units 1-3.

According to FIGS. 6a, 6b corresponding features are referred to with the references of FIG. 1-5. Any of the radar units 1-3 comprise an electronically scanning radar antenna 33, radar electronics 34 with a signal processing section (not shown), interface electronics 35 for the preparation of the radar data for transfer to the information processing unit 16 and a radar transparent radome cover 36 to protect the antenna 33 against environmental impact. The radome cover 36 can have a curved shape (FIG. 6a) or a flat shape to cover the antenna 33 (FIG. 6b).

The radome cover 36 is made of a radar transparent plastic, which has been plasma-treated in order to provide a nanostructure to its outer surface. The nanostructure prevents any icing of the radome 36 even at very low temperatures (down to −30° C.).

Figure 7:
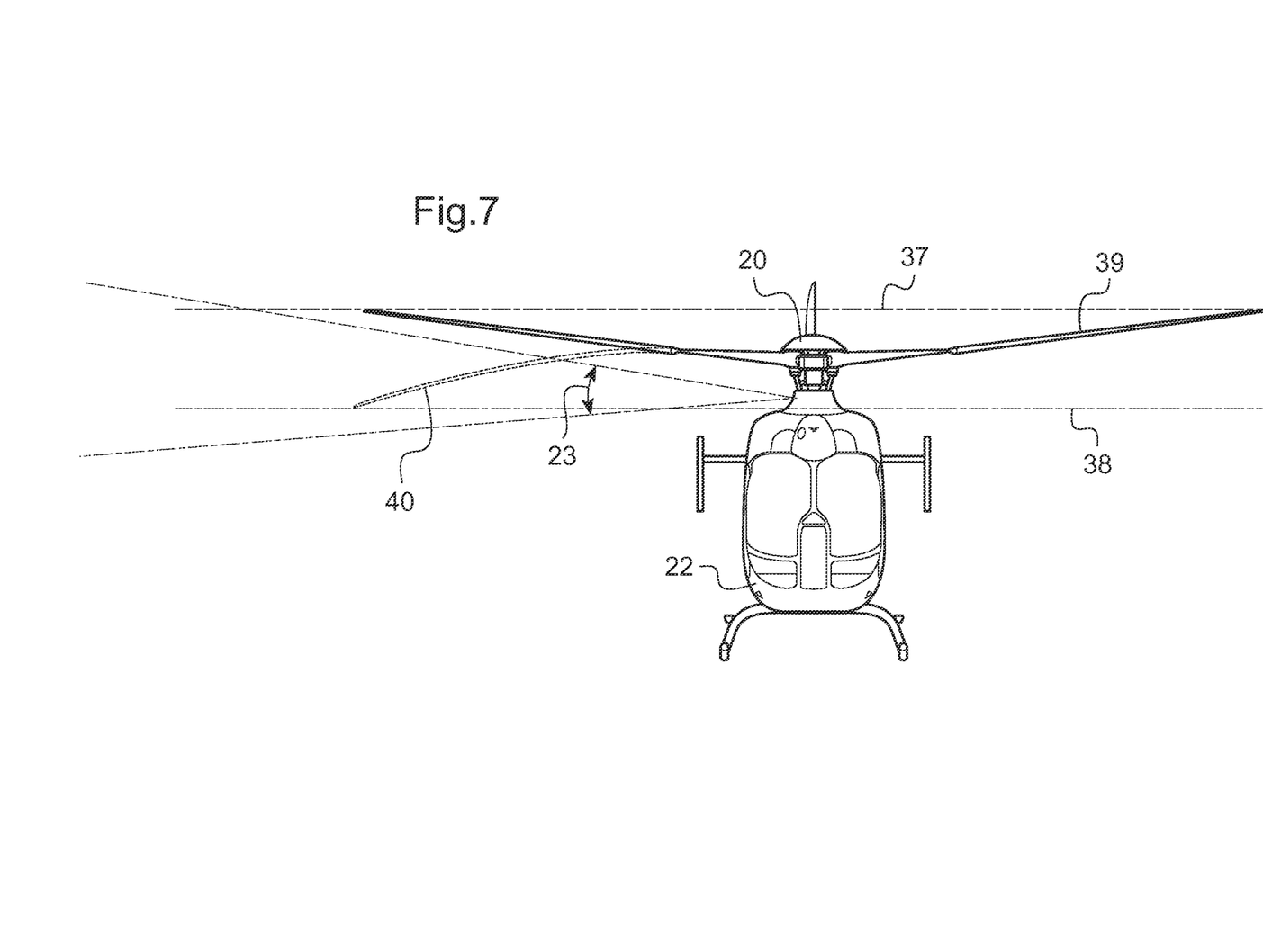

According to FIG. 7 corresponding features are referred to with the references of FIG. 1-6b. The setting of the respective horizontal scanning regions 7-9 of the radar units 1-3 takes into account a maximum of vertically upward bend 39 and vertically downward bend 40 of the rotor blades 29-32 relative to the rotor head 20. In order to allow assessment of any rotor strike risks at least at a distance of one rotor diameter an upper rotor plane 37 as well as a lower rotor plane 38 should be inside the vertical beam width 23, 24 of the radar units 1-3.

Figure 8:
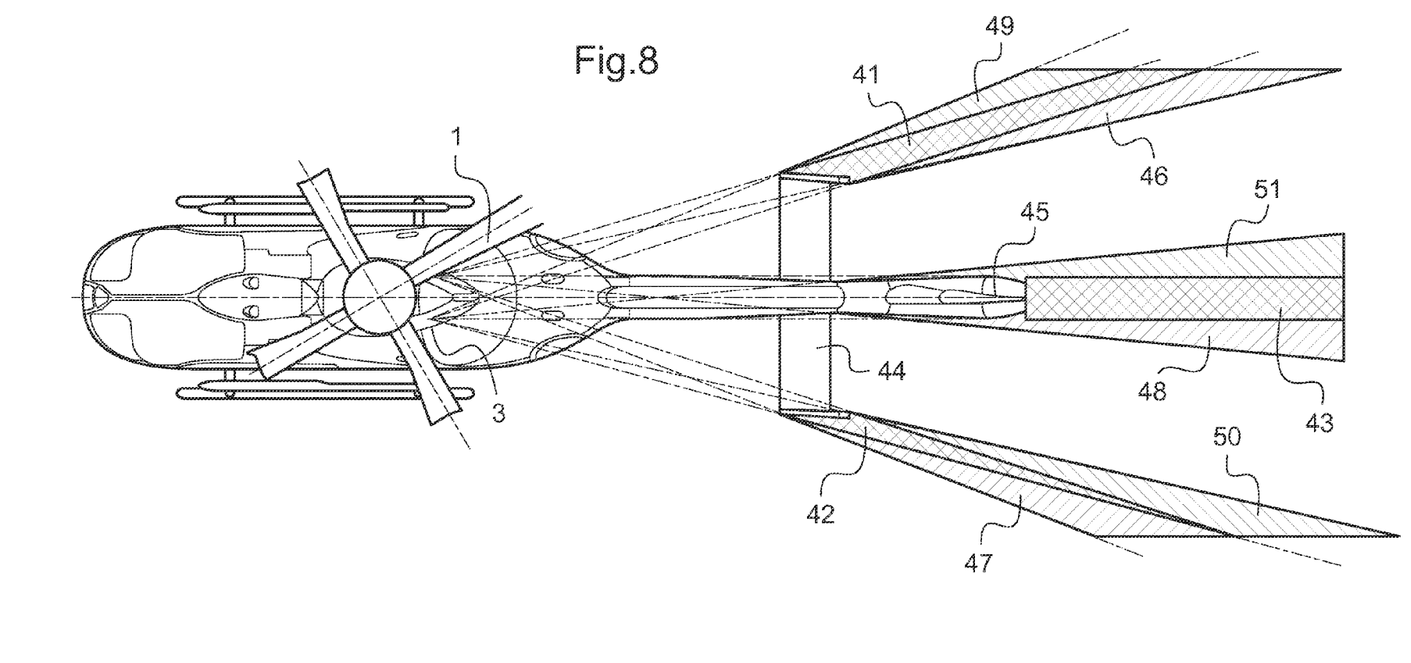

According to FIG. 8 corresponding features are referred to with the references of FIG. 1-7. An adequate overlap of the scanning regions 7, 9 of two adjacent radar units 1, 3, each having a scanning amplitude of more than 120°, allows reduction of any blind regions 41, 42, 43 of the proximity warning system. The left hand and right hand radar sensors 1 and 3 each provide different blind regions at an empennage 44 and at a casing 45 for a tail rotor. The right hand radar sensor 1 provides blind regions 46, 47 at the empennage 44 and a blind region 48 at the casing 45 for the tail rotor. The left hand radar sensor 3 provides blind regions 49, 50 at the empennage 44 and a blind region 51 at the casing 45 for the tail rotor. The combination of both overlapping scanning regions 7, 9 of the radar sensors 1 and 3 results in smaller blind spot regions 41, 42, 43 compared to the blind regions 46-51 resulting from the individual radar sensors 1 and 3.

REFERENCE LIST 1 right hand radar unit
2 forward radar unit
3 left hand radar unit
4-6 radar beam
7-9 scanning regions
10 obstacle
11-12 flanks
13 processor
14 filter 15 analysis unit
16 information processing unit
17 display instrument
20 rotor head
21 cowling
22 helicopter
23-24 vertical beam width
25 housing 25
26 joint 26
27 closure
28 non-rotating standpipe
29-32 rotor blades
33 radar antenna
34 radar electronics
35 interface electronics
36 radome cover
37 upper rotor plane
38 lower rotor plane
39 upward bend
40 downward bend
41-43 blind regions
44 empennage
45 casing
46-51 blind regions
52 direction of rotation of rotor
53 current scanning angle

What is claimed is:

1. A proximity warning system for a helicopter for detection of obstacles and warning against rotor strike by the obstacles, the helicopter comprising a roof top structure, a main rotor and a main rotor head, the main rotor head having a non-rotating standpipe on top of the main rotor head, the proximity warning system comprising:
   a standard torus-shaped housing mountable to a non-rotating standpipe or fixable on a roof top structure below a main rotor head, the standard torus-shaped housing being openable and having a joint and associated closure; and
   at least two radar units arranged to transmit microwaves and to receive reflections of the microwaves from obstacles, the at least two radar units being integrated into the standard torus-shaped housing for horizontally scanning an entire environment of 360° around the helicopter, a respective unit of the at least two radar units operating in at least one fundamental frequency in a range between 70 GHz and 80 GHz.

2. The proximity warning system according to claim 1, wherein a beam width of each radar units in elevation is limited from 4° to a maximum of 40°.

3. The proximity warning system according to claim 1, wherein the radar units each are scanning in a horizontal region.

4. The proximity warning system according to claim 1, wherein computing means are provided inside each radar unit and there are further provided at least one information processing unit with filtering means and at least one display instrument.

5. The proximity warning system according to claim 4, wherein at least one display instrument comprises generation means for generating warnings, the warnings being aural, haptic, and/or tactile warnings.

6. The proximity warning system according to claim 1, wherein each radar unit has a defined scanning region horizontally and the sum of all scanning regions is more than 360°.

7. The proximity warning system according to claim 1, wherein each radar unit has a defined scanning region with an associated radial range, the radial range being at least two times the diameter of a main rotor of an associated helicopter, including rotor blades.

8. The proximity warning system according to claim 1, further comprising at least one information processing unit, wherein the at least two radar units provide details about the range and the direction of any identified obstacles to the information processing unit.

9. The proximity warning system according to claim 1, wherein each of the at least two radar units has a respective defined horizontal scanning region and the at least two radar units are synchronized with the rotor blades in such a way that each of the at least two radar units performs scans while the rotor blades are not within the respective horizontal scanning region that is visible to the radar beams.

10. The proximity warning system according to claim 9, wherein the scanning regions of the rearward looking radar units are overlapping.

11. The proximity warning system according to claim 1, wherein the at least two radar units comprises one radar unit looking in a forward direction and two radar units looking side- and backwards to the left and to the right of the helicopter, respectively.

12. The proximity warning system according to claim 1, wherein the torus-shaped standard housing is a radome with the shape of a torus open towards one side for easy installation or de-installation of radar units.

13. The proximity warning system according to claim 1, further comprising an information processing unit, wherein a respective one of the at least two radar units comprise a scanning radar antenna, radar electronics for signal processing and an interface electronics for preparing information for transmission to the information processing unit, the transmission of information being performed by wire or by radio transmission.

14. A helicopter comprising:
   a fuselage;
   a main rotor rotatably coupled to and extending above the fuselage, the main rotor having a rotor head and a plurality of rotor blades defining a plane of rotation, the main rotor being configured to rotate relative to the fuselage about a central axis of rotation;
   a housing operatively coupled to the fuselage and positioned above or below the plane of rotation, the housing being generally torus-shaped and being rotationally fixed relative to the fuselage; and
   at least two radar units rotationally fixedly retained within the housing, each respective unit of the at least two radar units being configured to transmit microwaves and to receive reflections of the microwaves from obstacles to scan a distinct horizontal range, the at least two radar units being arranged within the housing to cover approximately 360° about the helicopter.

15. The helicopter of claim 14, wherein the housing is coupled to the fuselage below the plane of rotation.

16. The helicopter of claim 14, further comprising a standpipe operatively coupled to the rotor head and extending above the plane of rotation, the standpipe being rotationally fixed relative to the axis of rotation, wherein the housing is coupled to the standpipe.

17. The helicopter of claim 14, wherein the sum of the distinct horizontal ranges of the respective units of the at least two radar units is greater than 360°.

18. A proximity warning system for a helicopter, the warning system comprising:

a torus-shaped housing configured to non-rotatably couple to a helicopter above or below a main rotor plane of rotation; and at least two radar units rotationally fixedly retained within the housing, each respective unit of the at least two radar units being configured to transmit microwaves and to receive reflections of the microwaves from obstacles to scan a distinct horizontal range, the at least two radar units being arranged within the housing to cover approximately 360° about the housing.

19. The proximity warning system of claim 18, wherein the at least two radar units comprises three radar units spaced approximately equally about a circumference of the torus-shaped housing.

20. The proximity warning system of claim 18, wherein the housing includes a joint and a fastener, wherein when the fastener is removed the housing is openable to enable access to the at least two radar units.

* * * * *